(12) United States Patent
Takahashi et al.

(10) Patent No.: US 9,021,919 B2
(45) Date of Patent: May 5, 2015

(54) STRAIN WAVE GEAR APPARATUS

(71) Applicant: Canon Kabushiki Kaisha, Tokyo (JP)

(72) Inventors: Toshifumi Takahashi, Kawasaki (JP); Masaichi Sato, Tokyo (JP); Isamu Okuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 13/789,785

(22) Filed: Mar. 8, 2013

(65) Prior Publication Data

US 2013/0247716 A1    Sep. 26, 2013

(30) Foreign Application Priority Data

Mar. 23, 2012  (JP) ................. 2012-067037

(51) Int. Cl.
*F16H 49/00*   (2006.01)

(52) U.S. Cl.
CPC .................. *F16H 49/001* (2013.01)

(58) Field of Classification Search
CPC ....................................... F16H 49/001
USPC .......................................... 74/640
See application file for complete search history.

(56) References Cited

U.S. PATENT DOCUMENTS 3,747,434 A * 7/1973 Stahlhuth ................. 74/640
4,601,216 A * 7/1986 Inoue et al. ............... 74/640

FOREIGN PATENT DOCUMENTS

JP    2009-222168 A    10/2009

* cited by examiner

*Primary Examiner* — William Kelleher
*Assistant Examiner* — Terence Boes
(74) *Attorney, Agent, or Firm* — Fitzpatrick, Cella, Harper & Scinto (57) ABSTRACT

A strain wave gear apparatus includes a rigid internal gear, a flexible external gear, and a wave generator. The wave generator includes an input shaft fixing member including eccentric cams, bearings respectively fixed to outer sides of the eccentric cams, and housings respectively fitted to outer peripheral surfaces of the bearings. The eccentric cams are arranged side by side in a direction of an inclined axis inclined with respect to an input rotation axis at an inclination angle (θ) in a manner that respective center axes of the eccentric cams are parallel to the inclined axis and decentered in directions opposite to each other from the inclined axis. The housings are each formed into a tapered shape so that an outer peripheral surface of each of the housings is held in surface contact with an inner peripheral surface of the flexible external gear.

5 Claims, 4 Drawing Sheets

STRAIN WAVE GEAR APPARATUS

BACKGROUND OF THE INVENTION

1. Field of the Invention

The present invention relates to a strain wave gear apparatus including a rigid internal gear, a flexible external gear, and a wave generator.

2. Description of the Related Art

In general, a strain wave gear apparatus is known as a speed reducer which is lightweight and compact, and performs speed reduction at a high speed reduction ratio in a single step. A general strain wave gear apparatus includes an annular rigid internal gear, a flexible external gear arranged on an inside of the annular rigid internal gear, and a wave generator for partially meshing the flexible external gear with the rigid internal gear at two meshing positions by deflecting the flexible external gear in a radial direction, and moving the two meshing positions in a circumferential direction.

A typical conventional wave generator includes elliptical cams and elastically deformable special bearings respectively fitted into outer peripheral surfaces of the cams and each having a thin inner race and a thin outer race. Thus, there has been a strong demand for a wave generator which does not require the special bearings. In order to meet such a demand, there has been proposed a wave generator which uses general bearings (Japanese Patent Application Laid-Open No. 2009-222168).

However, in the wave generator disclosed in Japanese Patent Application Laid-Open No. 2009-222168, two eccentric rollers are arranged while overlapping with each other in a direction of an input rotation axis. Thus, the two meshing positions of the rigid internal gear and the flexible external gear are displaced relative to each other in a direction of the input rotation axis as viewed in a direction orthogonal to the direction of the input rotation axis. With this structure, when a load torque is applied to an output shaft, the load torque cannot be applied equally to the two meshing positions, which has hindered an increase in allowable load torque.

Further, when the load torque is applied to the output shaft, forces are generated respectively at the two meshing positions owing to a pressure angle of the teeth meshed with each other, and those forces are applied as radially inward forces to the wave generator. As described above, the two meshing positions are displaced from each other in the direction of the input rotation axis. Thus, vectors of the radially inward forces generated respectively at the two meshing positions are not opposed to each other, and a rotational moment is generated about a center of gravity of the wave generator. Therefore, when the load torque applied to the output shaft becomes higher, the rotational moment applied about the center of gravity of the wave generator also becomes higher, which has caused a problem of shortening of a life of the strain wave gear apparatus.

SUMMARY OF THE INVENTION

In view of the circumstances, it is an object of the present invention to provide a strain wave gear apparatus capable of stably transmitting a torque even under high load application, and prolonging a life of the strain wave gear apparatus by reducing a rotational moment applied about a center of gravity of a wave generator.

According to an exemplary embodiment of the present invention, there is provided a strain wave gear apparatus, including: an annular rigid internal gear; an annular flexible external gear arranged on an inside of the annular rigid internal gear; and a wave generator for partially meshing the annular flexible external gear with the annular rigid internal gear at two meshing positions by deflecting the annular flexible external gear, and moving the two meshing positions of the annular rigid internal gear and the annular flexible external gear in a circumferential direction, the wave generator being arranged on an inside of the annular flexible external gear. The wave generator includes: a first eccentric cam which has a circular outer shape and a center axis decentered in one direction, and is rotated about an input rotation axis through application of a rotational force; a second eccentric cam which has a circular outer shape and a center axis decentered in a direction opposite to the one direction, and is rotated about the input rotation axis through application of the rotational force, the first eccentric cam and the second eccentric cam being rotated integrally with each other; an annular first housing which is arranged to surround an outer peripheral surface of the first eccentric cam, and has an outer peripheral surface partially held in contact with an inner peripheral surface of the annular flexible external gear in a first contact region; an annular second housing which is arranged to surround an outer peripheral surface of the second eccentric cam, and has an outer peripheral surface partially held in contact with the inner peripheral surface of the annular flexible external gear in a second contact region; a first bearing which is interposed between the outer peripheral surface of the first eccentric cam and an inner peripheral surface of the annular first housing; and a second bearing which is interposed between the outer peripheral surface of the second eccentric cam and an inner peripheral surface of the annular second housing. The center axis of the first eccentric cam and the center axis of the second eccentric cam are each inclined with respect to the input rotation axis at an inclination angle at which at least a part of the first contact region and at least a part of the second contact region overlap with each other in a direction of the input rotation axis as viewed in a direction orthogonal to the direction of the input rotation axis.

According to the present invention, at least the part of the first contact region and at least the part of the second contact region overlap with each other as viewed in the direction orthogonal to the direction of the input rotation axis. Thus, the load torques applied to the two meshing positions of the annular rigid internal gear and the annular flexible external gear can be more equalized than in conventional structures. Therefore, the allowable load torque can be increased, and hence the load torques can be stably transmitted. In addition, the rotational moment applied about the center of gravity of the wave generator becomes lower, and hence the life of the strain wave gear apparatus can be prolonged.

Further features of the present invention will become apparent from the following description of exemplary embodiments with reference to the attached drawings.

BRIEF DESCRIPTION OF THE DRAWINGS

FIG. 1A is a front view of the strain wave gear apparatus, and FIG. 1B is a side view of the strain wave gear apparatus.

DESCRIPTION OF THE EMBODIMENTS

In the following, exemplary embodiments of the present invention are described in detail with reference to the drawings.

First Embodiment

Figure 1A:
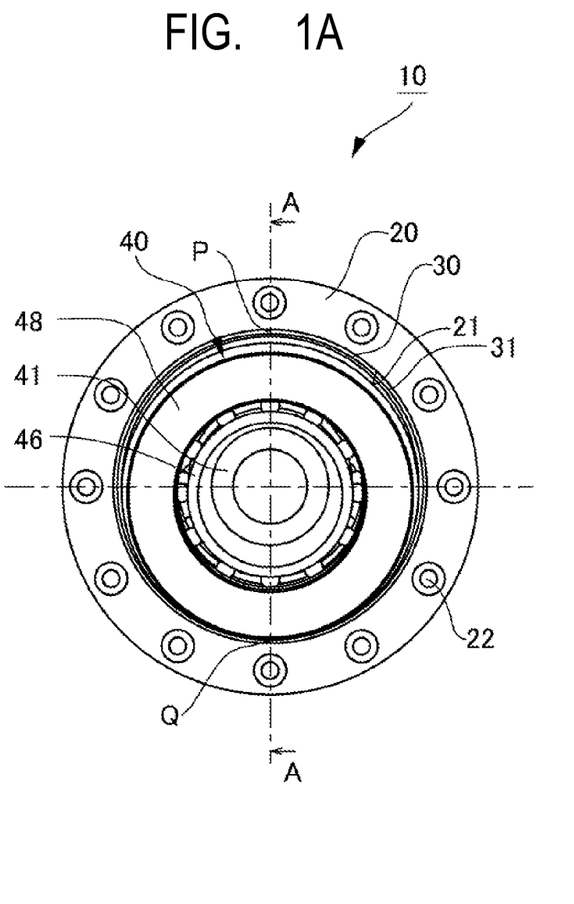
FIGS. 1A and 1B are each an explanatory view of a schematic structure of a strain wave gear apparatus according to a first embodiment of the present invention; specifically.
Figure 1B:
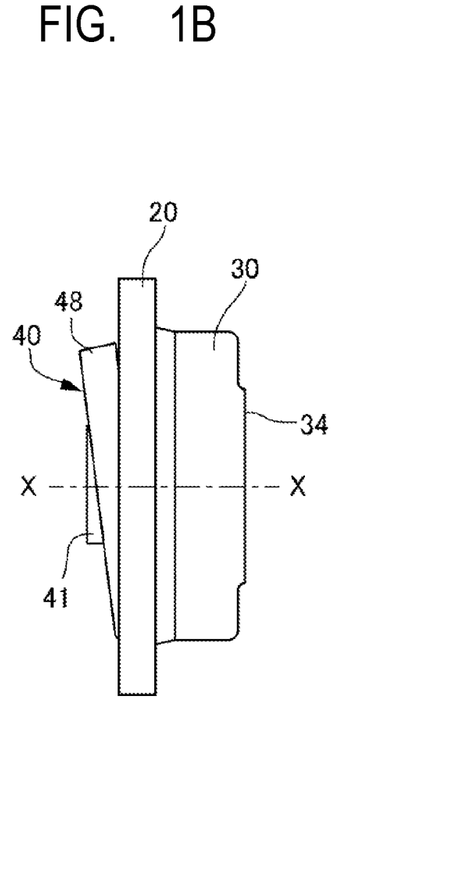
Figure 2:
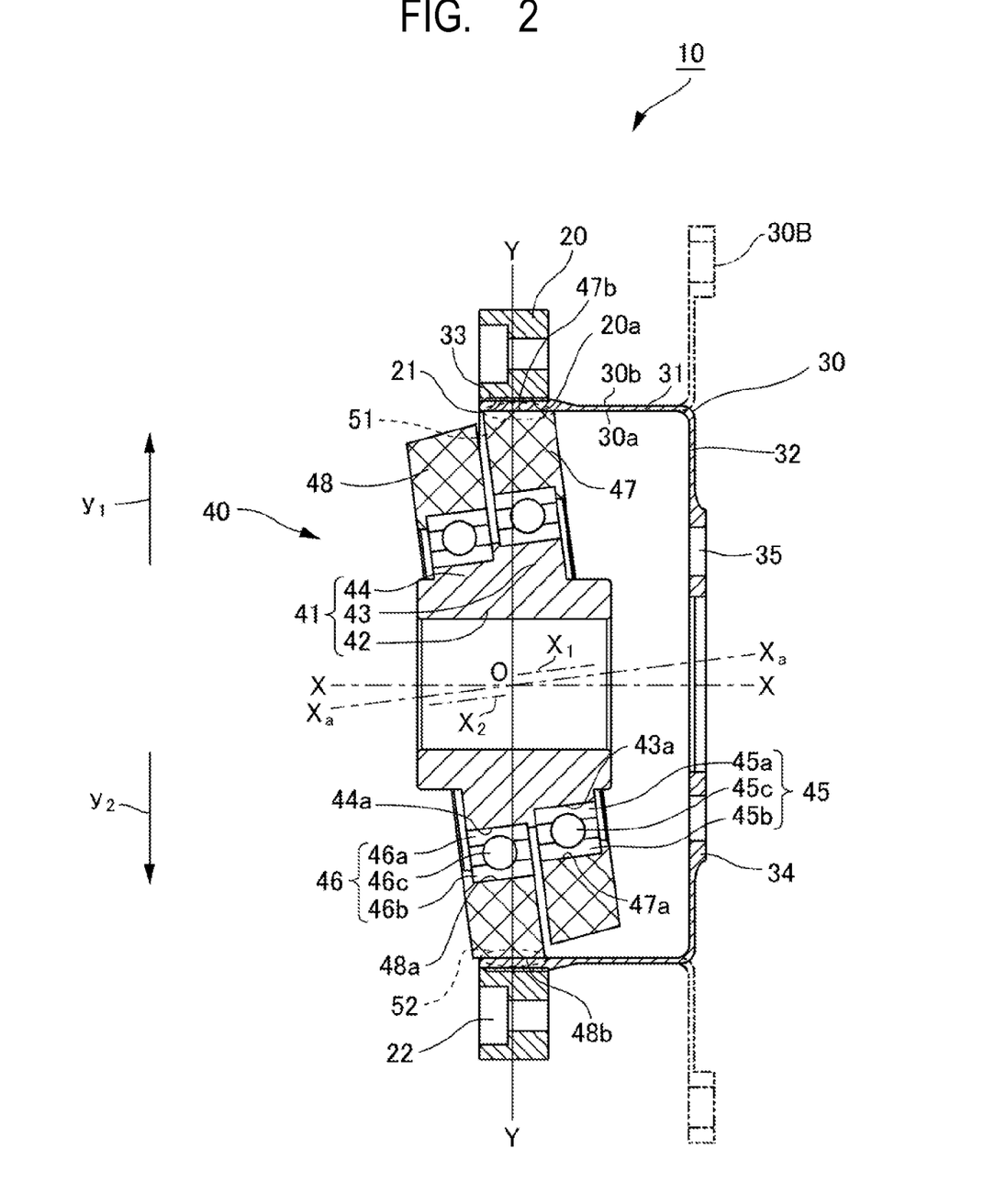
FIG. 2 is a sectional view of the strain wave gear apparatus, which is taken along the sectional plane A-A of FIG. 1A.

FIGS. 1A and 1B are each an explanatory view of a schematic structure of a strain wave gear apparatus according to a first embodiment of the present invention; specifically, FIG. 1A is a front view of the strain wave gear apparatus, and FIG. 1B is a side view of the strain wave gear apparatus. FIG. 2 is a sectional view of the strain wave gear apparatus, which is taken along the sectional plane A-A of FIG. 1A.

As illustrated in FIGS. 1A and 1B, a strain wave gear apparatus 10 is a strain wave gear apparatus speed reducer including a rigid internal gear 20, a flexible external gear 30, and a wave generator 40 which are arranged coaxially with an input rotation axis X-X.

The rigid internal gear 20 is formed of an annular rigid member. As illustrated in FIG. 2, the rigid internal gear 20 has an inner peripheral surface 20a provided with inner teeth 21. The rigid internal gear 20 is provided with a fixing bolt hole 22 for fixing the rigid internal gear 20 to a fixing member (not shown).

The flexible external gear 30 includes a disk-like bottom surface portion 32 and an annular portion 31 provided upright from the bottom surface portion 32, in other words, the flexible external gear 30 is formed into a cup shape in which an opposite side with respect to the bottom surface portion 32 is opened. The flexible external gear 30 is formed to be thinner than the rigid internal gear 20. In other words, the rigid internal gear 20 is formed to be thicker than the flexible external gear 30.

The flexible external gear 30 has an outer peripheral surface 30b on the cup opening side, which is provided with a smaller number of outer teeth 33 than the rigid internal gear 20. For example, the number of the outer teeth 33 of the flexible external gear 30 is set to be smaller by two than the number of the inner teeth 21 of the rigid internal gear 20. The flexible external gear 30 is arranged on an inside of the rigid internal gear 20 in a manner that the outer teeth 33 face the inner teeth 21. Further, the bottom surface portion 32 of the flexible external gear 30 is provided with an output shaft fixing portion 34 and an output shaft fixing bolt hole 35 for fixing an output shaft member (not shown).

The wave generator 40 is fitted to an inside of the flexible external gear 30 so as to come into contact with an inner peripheral surface 30a of the flexible external gear 30. With this, the flexible external gear 30 is subjected to radial deflection and elastically deformed into an elliptical shape. The elastic deformation of the flexible external gear 30 into the elliptical shape causes the multiple teeth of the rigid internal gear 20 and the multiple teeth of the flexible external gear 30 to partially mesh each other at two points P and Q (FIG. 1A) on a major axis of the elliptical shape. When the wave generator 40 is rotated about the input rotation axis X-X, the meshing positions P and Q of the rigid internal gear 20 and the flexible external gear 30 move in a circumferential direction. With this, the flexible external gear 30 is rotated at a rotational speed reduced with respect to a rotational speed of the wave generator 40 at a speed reduction ratio based on a difference in number of teeth between the rigid internal gear 20 and the flexible external gear 30.

As illustrated in FIG. 2, the wave generator 40 includes an input shaft fixing member 41 as an input rotation member, two bearings 45 and 46 (first bearing 45 and second bearing 46), and two housings 47 and 48 (first housing 47 and second housing 48).

Figure 3:
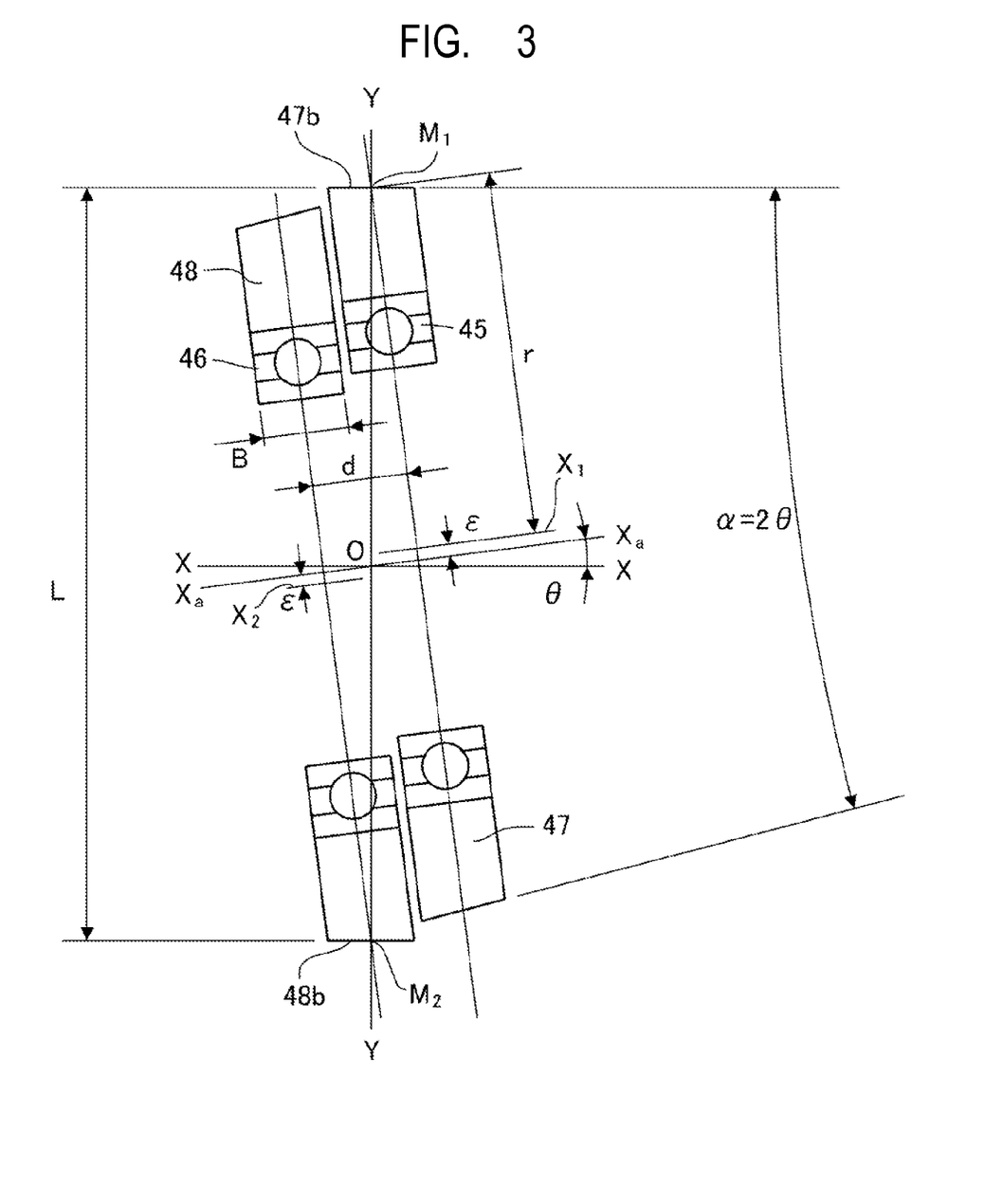
FIG. 3 is a schematic sectional view of a wave generator in cross-section taken along the sectional plane A-A of FIG. 1A.

A structure of the wave generator 40 is described in detail with reference to FIGS. 2 and 3. Note that, FIG. 3 is a schematic sectional view of the wave generator 40 in cross-section taken along the sectional plane A-A of FIG. 1A. The sectional plane A-A is defined as a plane including the input rotation axis X-X and the major axis of the elliptical shape of the elastically deformed flexible external gear 30.

An inclined axis $X_a$-$X_a$ is defined as a straight line inclined at an inclination angle θ with respect to the input rotation axis X-X in the sectional plane A-A, and intersects with the input rotation axis X-X at a point O. Further, a straight line Y-Y is defined as a straight line in the sectional plane A-A, which is perpendicular to the input rotation axis X-X extending through the point O. Further, in a direction of the input rotation axis X-X, center points of a first contact region 51 and a second contact region 52 in which the inner peripheral surface 30a of the flexible external gear 30 is held in contact with outer peripheral surfaces 47b and 48b of the two housings 47 and 48 are respectively defined as center points $M_1$ and $M_2$.

The input shaft fixing member 41 includes a cylindrical body 42 through which an input shaft member of a motor (not shown) is inserted, and a first eccentric cam 43 and a second eccentric cam 44 which each have a circular outer shape (preferably, perfect circular outer shape), respectively have center axes $X_1$ and $X_2$ decentered by predetermined eccentric amounts ε in directions opposite to each other, and are fixed to the body 42. In this embodiment, the body 42, the first eccentric cam 43, and the second eccentric cam 44 are integrally formed of the same member. The center axis $X_1$ of the first eccentric cam 43 is defined as an axis extending through a center of the first eccentric cam 43 in a direction orthogonal to a normal direction of an outer peripheral surface 43a of the first eccentric cam 43. The center axis $X_2$ of the second eccentric cam 44 is defined as an axis extending through a center of the second eccentric cam 44 in a direction orthogonal to a normal direction of an outer peripheral surface 44a of the second eccentric cam 44. Note that, although the body 42 allows the input shaft member to be inserted therethrough, the body 42 itself may be a shaft member.

The center axis $X_1$ is coaxial with a rotation axis of the first bearing 45 (inner race 45a) and a center axis of the first housing 47. Similarly, the center axis $X_2$ is coaxial with a rotation axis of the second bearing 46 (inner race 46a) and a center axis of the second housing 48. The eccentric cams 43 and 44 of the input shaft fixing member 41 are formed integrally with the body 42, and hence are rotated integrally about the input rotation axis X-X by a rotational force applied to the body 42. The first housing 47 and the second housing 48 are each an annular rigid member. The first housing 47 is arranged to surround the outer peripheral surface 43a of the first eccentric cam 43 with a clearance from the first eccentric cam 43. Similarly, the second housing 48 is arranged to surround the outer peripheral surface 44a of the second eccentric cam 44 with a clearance from the second eccentric cam 44.

The first bearing 45 and the second bearing 46 are each an annular radial bearing. The first bearing 45 includes the inner race 45a, an outer race 45b, and rolling elements (such as balls and rollers) 45c. Similarly, the second bearing 46 includes the inner race 46a, an outer race 46b, and rolling elements (such as balls and rollers) 46c. A general bearing is used as each of those bearings 45 and 46.

The first bearing 45 is interposed between the outer peripheral surface 43a of the first eccentric cam 43 and an inner peripheral surface 47a of the first housing 47. The inner race 45a is fixed to the outer peripheral surface 43a of the first eccentric cam 43, and the outer race 45b is fixed to the inner peripheral surface 47a of the first housing 47. Similarly, the second bearing 46 is interposed between the outer peripheral surface 44a of the second eccentric cam 44 and an inner peripheral surface 48a of the second housing 48. The inner race 46a is fixed to the outer peripheral surface 44a of the second eccentric cam 44, and the outer race 46b is fixed to the inner peripheral surface 48a of the second housing 48.

The center axis $X_1$ of the first eccentric cam 43 and the center axis $X_2$ of the second eccentric cam 44 are decentered in the directions opposite to each other. Thus, a circumferential part of the outer peripheral surface 47b of the first housing 47 comes into surface contact with the inner peripheral surface 30a of the flexible external gear 30 so as to deflect the flexible external gear 30 in a first direction $y_1$ orthogonal to the direction of the input rotation axis X-X. As described above, a region in which the outer peripheral surface 47b of the first housing 47 and the inner peripheral surface 30a of the flexible external gear 30 are held in contact with each other is defined as the first contact region 51. Similarly, a circumferential part of the outer peripheral surface 48b of the second housing 48 comes into surface contact with the inner peripheral surface 30a of the flexible external gear 30 so as to deflect the flexible external gear 30 in a second direction $y_2$ opposite to the first direction $y_1$. As described above, a region in which the outer peripheral surface 48b of the second housing 48 and the inner peripheral surface 30a of the flexible external gear 30 are held in contact with each other is defined as the second contact region 52.

The center axis $X_1$ of the first eccentric cam 43 and the center axis $X_2$ of the second eccentric cam 44 are each inclined with respect to the input rotation axis X-X at an inclination angle at which at least a part of the first contact region 51 and at least a part of the second contact region 52 overlap with each other in the direction of the input rotation axis X-X as viewed in a direction orthogonal to the direction of the input rotation axis X-X. The direction orthogonal to the direction of the input rotation axis X-X is, for example, the first direction $y_1$ and the second direction $y_2$ described above.

In particular, as illustrated in FIG. 3, it is preferred that the center axis $X_1$ of the first eccentric cam 43 and the center axis $X_2$ of the second eccentric cam 44 be each inclined with respect to the input rotation axis X-X at the inclination angle $\theta$ at which the center point $M_1$ and the center point $M_2$ are aligned with each other in the direction of the input rotation axis X-X as viewed in the first direction $y_1$ (or second direction $y_2$). In other words, it is preferred that the center axis $X_1$ of the first eccentric cam 43 and the center axis $X_2$ of the second eccentric cam 44 be each inclined in a manner that a plane having a normal direction corresponding to the direction of the input rotation axis X-X includes both the center point $M_1$ and the center point $M_2$ of the first contact region 51 and the second contact region 52.

The center axes $X_1$ and $X_2$ of the first eccentric cam 43 and the second eccentric cam 44 are each inclined with respect to the input rotation axis X-X at the inclination angle $\theta$, and hence the rotation axes of the first bearing 45 and the second bearing 46 (inner races 45a and 46a) and the center axes of the first housing 47 and the second housing 48 on the outside of the first eccentric cam 43 and the second eccentric cam 44 are also each inclined at the inclination angle $\theta$.

The inclined axis $X_a$-$X_a$ is inclined at the predetermined inclination angle $\theta$ with respect to the input rotation axis X-X. The center axes $X_1$ and $X_2$ of the first eccentric cam 43 and the second eccentric cam 44 are parallel to the inclined axis $X_a$-$X_a$, and decentered by the predetermined eccentric amounts $\epsilon$ in the directions opposite to each other. Thus, the rotation axes of the first bearing 45 and the second bearing 46 (inner races 45a and 46a) and the center axes of the first housing 47 and the second housing 48 on the outside of the first eccentric cam 43 and the second eccentric cam 44 are also decentered by the predetermined eccentric amounts $\epsilon$ in the directions opposite to each other with respect to the inclined axis $X_a$-$X_a$.

The first eccentric cam 43 and the second eccentric cam 44 are arranged side by side in a direction of the inclined axis $X_a$-$X_a$. Similarly, the first bearing 45 and the second bearing 46 are arranged side by side in the direction of the inclined axis $X_a$-$X_a$. Further, the first housing 47 and the second housing 48 are also arranged side by side in the direction of the inclined axis $X_a$-$X_a$.

The outer peripheral surface 47b of the first housing 47 and the outer peripheral surface 48b of the second housing 48 are each formed into a tapered shape so as to be held in surface contact with the inner peripheral surface 30a of the flexible external gear 30. Specifically, the outer peripheral surface 47b of the first housing 47 and the outer peripheral surface 48b of the second housing 48 are each formed into a tapered shape having a taper angle $\alpha$ of $2\theta$ so as to be parallel to the input rotation axis X-X in the sectional plane A-A and held in surface contact with the inner peripheral surface 30a of the flexible external gear 30.

Here, reference symbol L represents a major diameter of the elliptical shape of the inner peripheral surface 30a of the cup-shaped flexible external gear 30 after the elastic deformation (linear distance between the center point $M_1$ and the center point $M_2$). Further, reference symbol d represents an amount of separation of the two bearings 45 and 46 in the direction of the inclined axis $X_a$-$X_a$ (distance between a straight line which is perpendicular to the inclined axis $X_a$-$X_a$ and extends through the center point $M_1$ and a straight line which is perpendicular to the inclined axis $X_a$-$X_a$ and extends through the center point $M_2$). Further, reference symbol r represents a radius of curvature of each of the outer peripheral surface 47b of the first housing 47 and the outer peripheral surface 48b of the second housing 48 at corresponding one of the center point $M_1$ and the center point $M_2$. The inclination angle $\theta$ and the eccentric amount $\epsilon$ are set to satisfy the following relational expressions (1) and (2).

$$\theta = \sin^{-1}(d/L) \quad (1)$$

$$\epsilon = (L \times \cos \theta / 2) - r \quad (2)$$

According to the structure described above, the center points in the two contact regions, specifically, the center point $M_1$ in the first contact region 51 in which the outer peripheral surface 47b of the first housing 47 is held in contact with the inner peripheral surface 30a of the flexible external gear 30 and the center point $M_2$ in the second contact region 52 in which the outer peripheral surface 48b of the second housing 48 is held in contact with the inner peripheral surface 30a of the flexible external gear 30 are positioned symmetrically with each other across the input rotation axis X-X. With this, the center point $M_1$ and the center point $M_2$ are not misaligned with each other in the direction of the input rotation axis X-X. Therefore, meshing states at two meshing positions P and Q can also be maintained symmetrically with each other across the input rotation axis X-X.

When the input rotation member (not shown) fixed to the input shaft fixing member 41 is driven and rotated by the motor (not shown) or the like, the wave generator 40 is rotated. Along with the rotation of the wave generator 40, the two housings 47 and 48 are rolled along the inner peripheral surface 30a of the cup-shaped flexible external gear 30 while pressing the same. Thus, along with the rotation of the wave generator 40, the two meshing positions P and Q are also rotated in the circumferential direction while maintaining a symmetrical positional relationship across the input rotation axis X-X.

The flexible external gear 30 is configured to have two teeth fewer than the rigid internal gear 20. Thus, when the wave generator 40 is rotated at 360 degrees, the flexible external gear 30 is displaced relative to the rigid internal gear 20 by an amount corresponding to the two teeth in a direction reverse to a rotational direction of the wave generator 40. The rigid internal gear 20 is fixed to the fixing member (not shown), and hence a markedly high speed-reduction output can be obtained from the flexible external gear 30.

The first bearing 45 and the second bearing 46 are provided respectively between the first eccentric cam 43 and the first housing 47 and between the second eccentric cam 44 and the second housing 48 at the inclination angle θ with respect to the input rotation axis X-X. When a load torque is applied to the output shaft member (not shown), a force is generated owing to a pressure angle of the teeth meshed with each other. A radial force and an axial force are applied to each of the first bearing 45 and the second bearing 46. When the inclination angle θ is set to be high, axial loads applied to the first bearing 45 and the second bearing 46 become higher. As a result, lives of the first bearing 45 and the second bearing 46 are shortened. Therefore, it is desired that the inclination angle θ be set to be as small as possible. As is understood from the relational expression (1), the inclination angle θ can be reduced by suppressing the separation amount d of the two bearings 45 and 46.

In this context, a minimum value of the inclination angle θ at which the first bearing 45 and the second bearing 46 are each inclined can be determined as follows. A width of each of the first bearing 45 and the second bearing 46 in the direction parallel to the inclined axis $X_a$-$X_a$ is defined as a width B. When the two bearings 45 and 46 are held in contact with each other while overlapping in perfect alignment in the direction of the inclined axis $X_a$-$X_a$, a relationship of d=B is established. Therefore, in order to prevent the two bearings 45 and 46 from being held in contact with each other, it is necessary to set the inclination angle θ within a range of θ>$\sin^{-1}$(B/L). Thus, it is desired that the inclination angle θ be set to be as small as possible within this range while maintaining assembly efficiency and smooth rotational movements of the first bearing 45 and the second bearing 46.

However, for longer lives of the first bearing 45 and the second bearing 46, the inclination angle θ can be set to be high as long as the axial load applied to the first bearing 45 and the second bearing 46 falls within an allowable range. For example, when a resultant force F of forces applied to the wave generator 40 is applied in a direction from the center point $M_1$ to the point O at the meshing position P while the first bearing 45 and the second bearing 46 are used in continuous operation at a rotational speed n, a basic rating life Lh can be calculated by using the following equations (3) to (6).

$$Fr = F \times \cos\theta \quad (3)$$

$$Fa = F \times \sin\theta \quad (4)$$

$$P = X \times Fr + Y \times Fa \quad (5)$$

$$Lh = 106 \times (Cr/P)^3 / (60 \times n) \quad (6)$$

where

Fr is the radial loads applied to the first bearing 45 and the second bearing 46, Fa is the axial loads applied to the first bearing 45 and the second bearing 46, P is an equivalent load, X is a radial load coefficient (refer to JIS B 1518), Y is an axial load coefficient (refer to JIS B 1518), and Cr is a basic dynamic load rating.

For example, a strain wave gear apparatus having a basic rating life Lh of 10,000 hours or longer under conditions of F=1,200 N and n=1,000 rpm is considered. When single row deep groove ball bearings each having a nominal number 6907 (basic dynamic load rating Cr of 10,600 [N]) are selected and the inclination angle θ is set to 18 degrees, the basic rating life Lh is approximately equal to 10,040 hours, which is longer than 10,000 hours. Therefore, it is understood that the inclination angle θ of 18 degrees is approximately a maximum allowable angle.

In other words, the inclination angle θ may be appropriately set within a range of $\sin^{-1}$(B/L)≤θ≤(angle determined based on allowable axial loads of the first bearing 45 and the second bearing 46).

Note that, in the first embodiment, the wave generator 40 can be configured by inclining the first bearing 45 and the second bearing 46 each having a general structure, but it is desired that the inclination angle θ be set to be as small as possible for the longer lives of the first bearing 45 and the second bearing 46.

As described above in the first embodiment, the wave generator 40 includes the first bearing 45 and the second bearing 46 each having a general structure. Despite such a structure of the wave generator 40, at least a part of the first contact region 51 and at least a part of the second contact region 52 overlap with each other as viewed in the first direction $y_1$. Thus, load torques applied to the two meshing positions P and Q can be more equalized than in conventional structures. Therefore, an allowable load torque can be increased, and hence the load torques can be stably transmitted. In addition, a rotational moment applied about a center of gravity of the wave generator 40 becomes lower, and hence a life of the strain wave gear apparatus 10 can be prolonged.

In particular, in the first embodiment, the center point $M_1$ of the first contact region 51 and the center point $M_2$ of the second contact region 52 are aligned with each other as viewed in the first direction $y_1$. With this, the two meshing positions P and Q in the direction of the input rotation axis X-X are maintained symmetrically with each other across the input rotation axis X-X, and hence application of the load torques can be more equalized. Therefore, the allowable load torque can be more increased, and hence the load torques can be more stably transmitted. In addition, the rotational moment applied about the center of gravity of the wave generator 40 becomes much lower, and hence the life of the strain wave gear apparatus 10 can be more prolonged.

Second Embodiment

Figure 4:
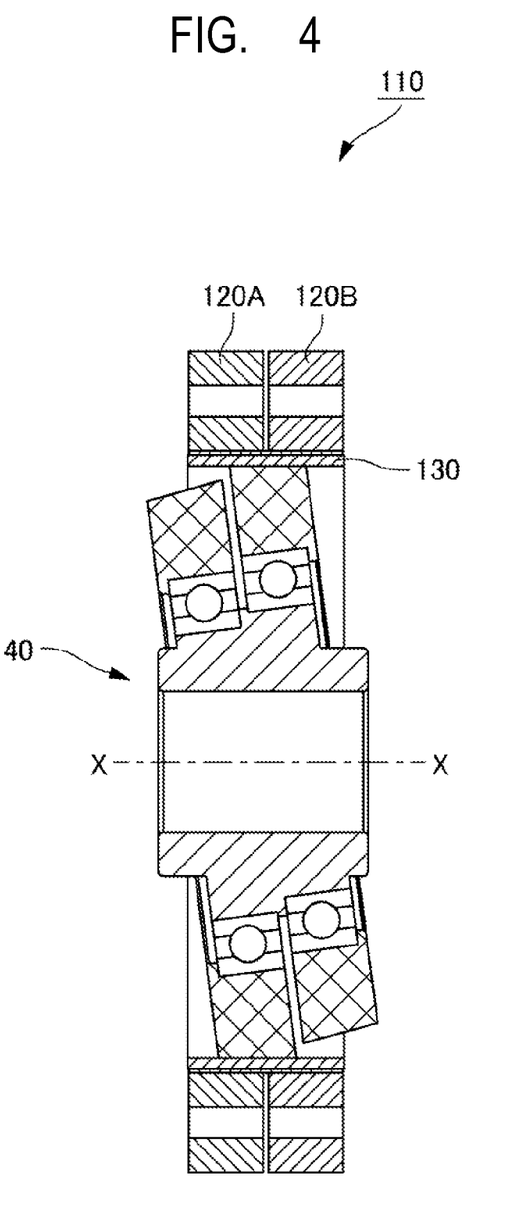
FIG. 4 is a sectional view of a strain wave gear apparatus according to a second embodiment of the present invention.

Next, a strain wave gear apparatus according to a second embodiment of the present invention is described. FIG. 4 is a sectional view of the strain wave gear apparatus according to the second embodiment of the present invention. Note that, in FIG. 4, the same components as those of the strain wave gear apparatus 10 according to the first embodiment are denoted by the same reference symbols, and description thereof is omitted.

A strain wave gear apparatus 110 according to the second embodiment of the present invention is a flat strain wave gear apparatus speed reducer including an annular rigid internal gear 120, an annular flexible external gear 130, and a wave generator 40 which are arranged coaxially with the input rotation axis X-X, the wave generator 40 having the same structure as the wave generator 40 in the first embodiment described above. In other words, the wave generator 40 described above in the first embodiment is applicable also to the flat strain wave gear apparatus speed reducer.

The rigid internal gear 120 includes a first rigid internal gear 120A and a second rigid internal gear 120B which are aligned coaxially with the input rotation axis X-X. The flexible external gear 130 is formed to be thinner than the rigid internal gear 120 (120A and 120B). In other words, the rigid internal gear 120 (120A and 120B) is formed to be thicker than the flexible external gear 130. The second rigid internal gear 120B is configured to have fewer teeth (for example, two teeth fewer) than the first rigid internal gear 120A. The flexible external gear 130 has an outer peripheral surface provided with outer teeth as many as inner teeth of the second rigid internal gear 120B.

The wave generator 40 is fitted to an inside of the flexible external gear 130 so as to come into contact with an inner peripheral surface of the flexible external gear 130. With this, the flexible external gear 130 is subjected to radial deflection and elastically deformed into an elliptical shape. The elastic deformation of the flexible external gear 130 into the elliptical shape causes the multiple teeth of the rigid internal gear 120 and the multiple teeth of the flexible external gear 130 to partially mesh each other at two points on a major axis of the elliptical shape. When the wave generator 40 is rotated about the input rotation axis X-X, the meshing positions of the rigid internal gear 120 and the flexible external gear 130 move in a circumferential direction. With this, the second rigid internal gear 120B is rotated relative to the first rigid internal gear 120A at a rotational speed reduced with respect to a rotational speed of the wave generator 40 (in other words, eccentric cam) at a speed reduction ratio based on a difference in number of teeth between the first rigid internal gear 120A and the flexible external gear 130. Therefore, when any one of the first rigid internal gear 120A and the second rigid internal gear 120B is fixed to a fixing member (not shown), another of the first rigid internal gear 120A and the second rigid internal gear 120B is rotated relative to the one of the first rigid internal gear 120A and the second rigid internal gear 120B at the rotational speed reduced with respect to the rotational speed of the wave generator 40 at the speed reduction ratio based on the above-mentioned difference in number of teeth.

In detail, along with rotation of the wave generator 40, the meshing positions of the first rigid internal gear 120A and the flexible external gear 130 and the meshing positions of the second rigid internal gear 120B and the flexible external gear 130 move in the circumferential direction. The flexible external gear 130 has two teeth fewer than the first rigid internal gear 120A. Thus, when the wave generator 40 is rotated at 360 degrees, the flexible external gear 130 is displaced relative to the first rigid internal gear 120A by an amount corresponding to the two teeth in a direction reverse to the rotational direction of the wave generator 40. Meanwhile, the flexible external gear 130 and the second rigid internal gear 120B have the same number of teeth, and hence the second rigid internal gear 120B is not displaced in the rotational direction. Therefore, when any one of the first rigid internal gear 120A and the second rigid internal gear 120B is fixed to the fixing member (not shown), a markedly high speed-reduction output can be obtained from the another of the first rigid internal gear 120A and the second rigid internal gear 120B.

As described above in the second embodiment, the wave generator 40 includes the bearings each having a general structure. Despite such a structure of the wave generator 40, at least a part of a first contact region and at least a part of a second contact region overlap with each other as viewed in a direction orthogonal to the direction of the input rotation axis X-X. Thus, load torques applied to the two meshing positions can be more equalized than in conventional structures. Therefore, an allowable load torque can be increased, and hence the load torques can be stably transmitted. In addition, the rotational moment applied about the center of gravity of the wave generator 40 becomes lower, and hence a life of the strain wave gear apparatus 110 can be prolonged.

In particular, in the second embodiment, a center point of the first contact region and a center point of the second contact region are aligned with each other as viewed in the direction orthogonal to the direction of the input rotation axis X-X. Thus, the two meshing positions in the direction of the input rotation axis X-X are maintained symmetrically with each other across the input rotation axis X-X, and hence application of the load torques can be more equalized. Therefore, the allowable load torque can be further increased, and hence the load torques can be more stably transmitted. In addition, the rotational moment applied about the center of gravity of the wave generator 40 becomes much lower, and hence the life of the strain wave gear apparatus 110 can be more prolonged.

The strain wave gear apparatus 110 according to the second embodiment is a flat strain wave gear apparatus, and hence is compact and occupies a smaller space in comparison with the strain wave gear apparatus 10 described in the first embodiment.

Note that, the present invention is not limited to the embodiments described above, and various modifications may be made thereto within the technical scope of the present invention by a person having ordinary skill in the art.

For example, the present invention is applicable also to what is called a top-hat shaped strain wave gear apparatus including, as indicated by the two-dot chain line in FIG. 2, a flexible external gear 30B which includes an output shaft fixing portion 34 formed to have a flange portion projected radially outward from the annular portion 31.

Further, although the wave generator includes two eccentric cams, two bearings, and two housings in each of the cases described in the embodiments above, the number of those components are not limited to two. For example, in a case where the wave generator includes an equal number of at least three eccentric cams, at least three multiple bearings, and at least three multiple housings, any adjacent two eccentric cams of the at least three eccentric cams may serve as the first eccentric cam and the second eccentric cam. In this case, one of the multiple bearings and one of the multiple housings, which are formed correspondingly to the first eccentric cam, respectively serve as the first bearing and the first housing, and another of the multiple bearings and another of the multiple housings, which are formed correspondingly to the second eccentric cam, respectively serve as the second bearing and the second housing.

Further, although the first eccentric cam and the second eccentric cam are formed integrally with the body in each of the embodiments described above, the present invention is not limited thereto. For example, as long as the first eccentric cam and the second eccentric cam are rotated integrally with each other, the first eccentric cam and the second eccentric cam may be separately formed. In this case, the first eccentric cam and the second eccentric cam may be formed of the same material, or may be formed of different materials.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-067037, filed Mar. 23, 2012, which is hereby incorporated by reference herein in its entirety.

What is claimed is:

1. A strain wave gear apparatus, comprising:
an annular rigid internal gear;
an annular flexible external gear arranged on an inside of the annular rigid internal gear; and
a wave generator for partially meshing the annular flexible external gear with the annular rigid internal gear at two meshing positions by deflecting the annular flexible external gear, and moving the two meshing positions of the annular rigid internal gear and the annular flexible external gear in a circumferential direction, the wave generator being arranged on an inside of the annular flexible external gear,
wherein the wave generator comprises:
a first eccentric cam which has a circular outer shape, is inclined with respect to an input rotation axis, and has a center axis decentered with respect to the input rotation axis, and the first eccentric cam is rotatable about the input rotation axis through application of a rotational force;
a second eccentric cam which has a circular outer shape, is inclined with respect to the input rotation axis, and has a center axis decentered with respect to the input rotation axis in a direction opposite to the direction in which the first eccentric cam is decentered, such that the center axis of the second eccentric cam is not coaxial with the center axis of the first eccentric cam, and the second eccentric cam is rotatable about the input rotation axis through application of the rotational force
the first eccentric cam and the second eccentric cam being rotated integrally with each other;
an annular first housing which is arranged to surround an outer peripheral surface of the first eccentric cam, and has an outer peripheral surface partially held in contact with an inner peripheral surface of the annular flexible external gear in a first contact region;
an annular second housing which is arranged to surround an outer peripheral surface of the second eccentric cam, and has an outer peripheral surface partially held in contact with the inner peripheral surface of the annular flexible external gear in a second contact region;
a first bearing which is interposed between the outer peripheral surface of the first eccentric cam and an inner peripheral surface of the annular first housing; and
a second bearing which is interposed between the outer peripheral surface of the second eccentric cam and an inner peripheral surface of the annular second housing, and
wherein the center axis of the first eccentric cam and the center axis of the second eccentric cam are each inclined with respect to the input rotation axis at an inclination angle at which at least a part of the first contact region and at least a part of the second contact region overlap with each other in a direction orthogonal to the direction of the input rotation axis.

2. The strain wave gear apparatus according to claim 1, wherein the center axis of the first eccentric cam and the center axis of the second eccentric cam are each inclined with respect to the input rotation axis at an inclination angle at which a center of the first contact region in the direction of the input rotation axis and a center of the second contact region in the direction of the input rotation axis are aligned with each other in the direction of the input rotation axis as viewed in the direction orthogonal to the direction of the input rotation axis.

3. The strain wave gear apparatus according to claim 1,
wherein the annular rigid internal gear comprises:
a first rigid internal gear; and
a second rigid internal gear having a smaller number of teeth than the first rigid internal gear,
wherein the annular flexible external gear is configured to have an equal number of teeth as that of the second rigid internal gear, and
wherein the second rigid internal gear is rotated relative to the first rigid internal gear at a rotational speed reduced with respect to a rotational speed of the wave generator at a speed reduction ratio based on a difference in number of teeth between the first rigid internal gear and the annular flexible external gear.

4. The strain wave gear apparatus according to claim 1,
wherein the outer peripheral surface of the first housing and the outer peripheral surface of the second housing are formed into a tapered shape.

5. The strain wave gear apparatus according to claim 4,
wherein the outer peripheral surface of the first housing is in surface contact with the inner peripheral surface of the flexible external gear and the outer peripheral surface of the second housing is in surface contact with the inner peripheral surface of the flexible external gear.

* * * * *